US012385264B2

(12) United States Patent
Beaumont et al.

(10) Patent No.: US 12,385,264 B2
(45) Date of Patent: Aug. 12, 2025

(54) ADDITIVE MANUFACTURING OF CONCRETE CONSTRUCTION ELEMENTS

(71) Applicants: SAINT-GOBAIN WEBER, Sucy-en-Brie (FR); SAINT-GOBAIN ISOVER, Courbevoie (FR)

(72) Inventors: Julien Beaumont, Paris (FR); Elena Dunaeva, Paris (FR); Jérôme Gilles, Mont l'Eveque (FR)

(73) Assignees: SAINT-GOBAIN WEBER, Sucy-en-Brie (FR); SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 17/767,495

(22) PCT Filed: Oct. 8, 2020

(86) PCT No.: PCT/EP2020/078294
§ 371 (c)(1),
(2) Date: Apr. 8, 2022

(87) PCT Pub. No.: WO2021/069601
PCT Pub. Date: Apr. 15, 2021

(65) Prior Publication Data
US 2024/0076885 A1  Mar. 7, 2024

(30) Foreign Application Priority Data
Oct. 9, 2019 (FR) .............................. 1911181

(51) Int. Cl.
*E04G 21/02* (2006.01)
*B33Y 10/00* (2015.01)
(Continued)

(52) U.S. Cl.
CPC ............... *E04G 21/02* (2013.01); *E04B 1/74* (2013.01); *E04B 2/8635* (2013.01); *B33Y 10/00* (2014.12); *B33Y 80/00* (2014.12)

(58) Field of Classification Search
CPC ......... E04G 21/02; E04B 1/74; E04B 2/8635; B33Y 10/00; B33Y 80/00
See application file for complete search history.

(56) References Cited

U.S. PATENT DOCUMENTS 5,209,037 A * 5/1993 Kennedy ................... E04C 1/41
52/612
5,339,592 A * 8/1994 Schmid ..................... E04C 1/41
52/309.12
(Continued)

FOREIGN PATENT DOCUMENTS

EP  2610417 A1 * 7/2013 .......... B25J 19/0025
EP  3 029 811 A1  6/2016
(Continued)

OTHER PUBLICATIONS

International Search Report as issued in International Patent Application No. PCT/EP2020/078294, dated Jan. 15, 2021.
(Continued)

Primary Examiner — Omar F Hijaz
(74) Attorney, Agent, or Firm — Pillsbury Winthrop Shaw Pittman LLP

(57) ABSTRACT

A method for obtaining a concrete construction element by additive manufacturing, in which superposed mortar layers are successively deposited so as to form two wall surfaces, opposite one another, so as to form a cavity, as well as a plurality of reinforcement elements each extending from one of the wall surfaces toward the cavity, each reinforcement element being in contact with neither the wall surface opposite to that from which it extends, nor with a reinforce- (Continued)

ment element extending from the opposite wall surface to that from which it extends.

24 Claims, 6 Drawing Sheets

(51) Int. Cl.
*B33Y 80/00* (2015.01)
*E04B 1/74* (2006.01)
*E04B 2/86* (2006.01)

(56) References Cited

U.S. PATENT DOCUMENTS

| | | | |
|---|---|---|---|
| 10,471,665 B1* | 11/2019 | Marshall, Jr. | B29C 64/393 |
| 11,014,295 B2* | 5/2021 | Villette | B29C 64/336 |
| 2017/0165917 A1* | 6/2017 | McKiel, Jr. | B29C 64/393 |
| 2017/0365365 A1* | 12/2017 | White | H05K 9/0001 |
| 2019/0277045 A1 | 9/2019 | Hirayama | |
| 2023/0313520 A1* | 10/2023 | Maguire | E04H 1/1205 |

FOREIGN PATENT DOCUMENTS

| | | |
|---|---|---|
| JP | 2019-157336 A | 9/2019 |
| JP | 2020-026099 A | 2/2020 |
| KR | 10-1911404 B1 | 12/2018 |
| WO | WO 2016/019434 A1 | 2/2016 |

OTHER PUBLICATIONS

First Office Action as issued in Japanese Patent Application No. 2022-521565, dated Apr. 2, 2024.

* cited by examiner

[Fig. 1]
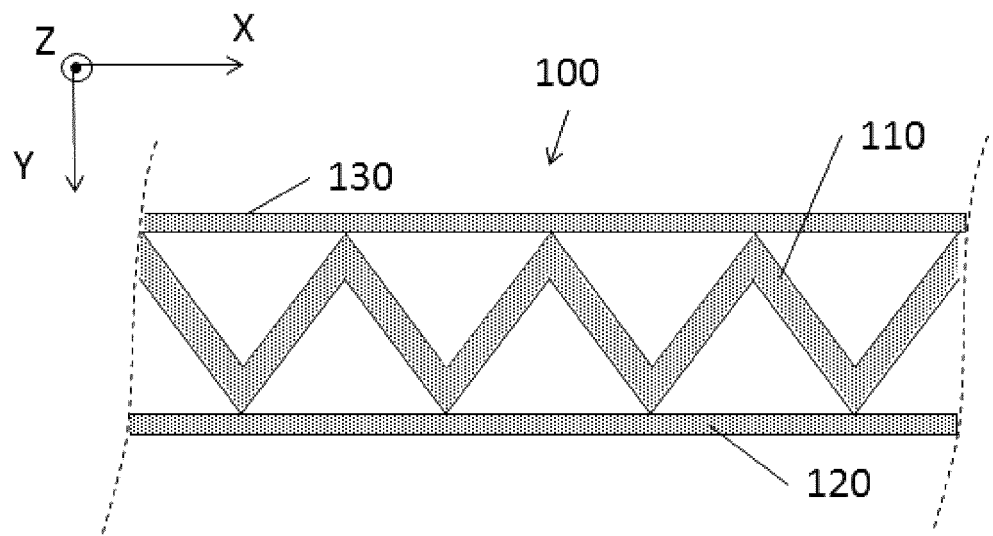
[Fig. 2]
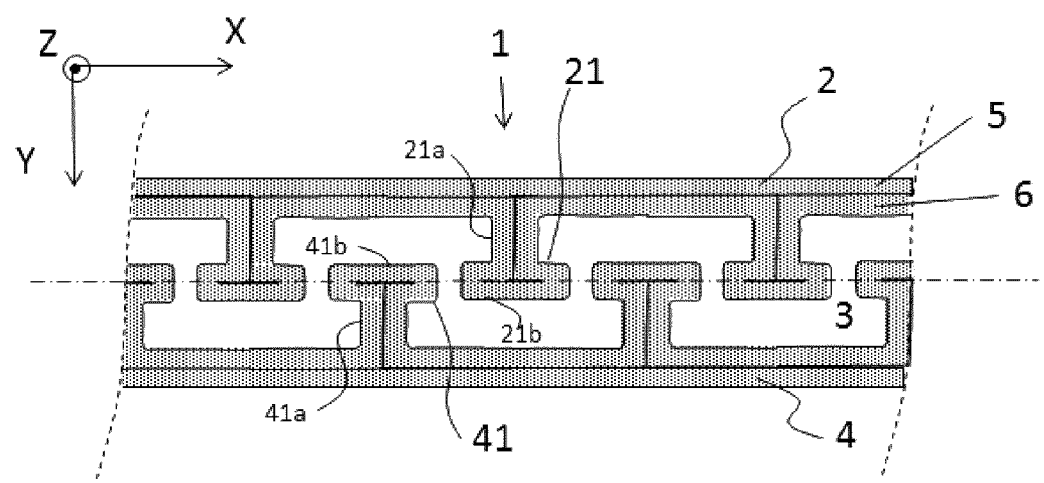

[Fig. 3]
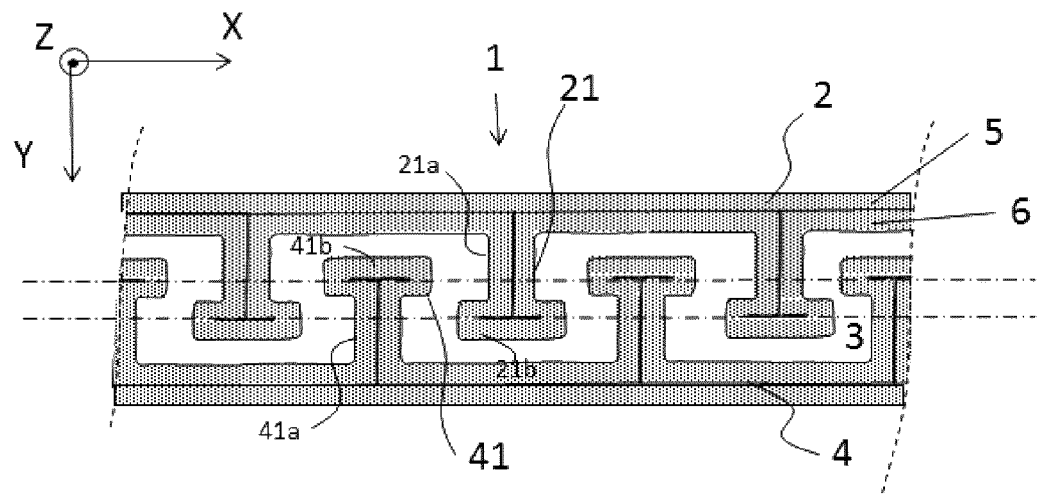
[Fig. 4]
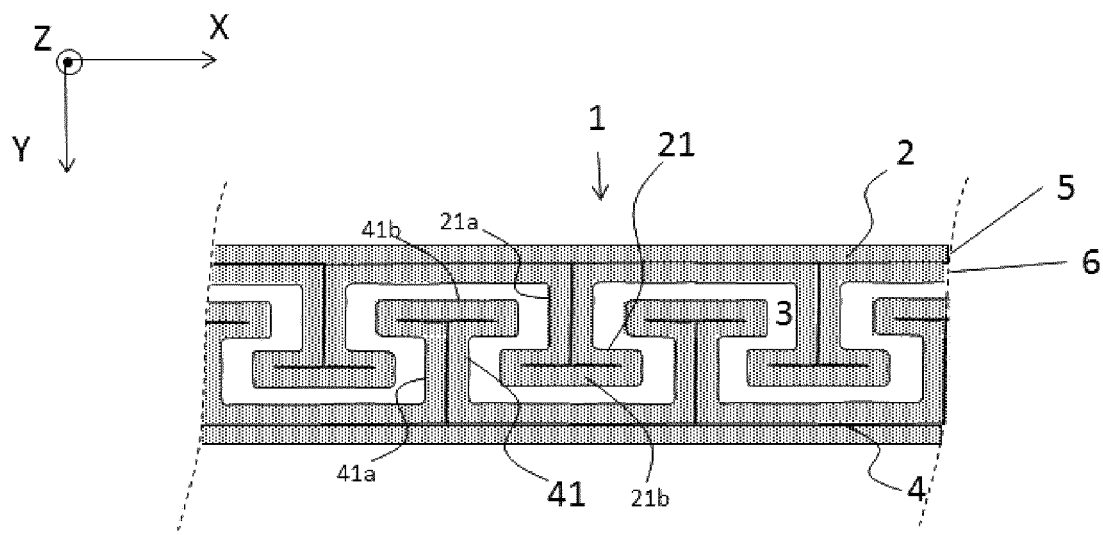

[Fig. 5]
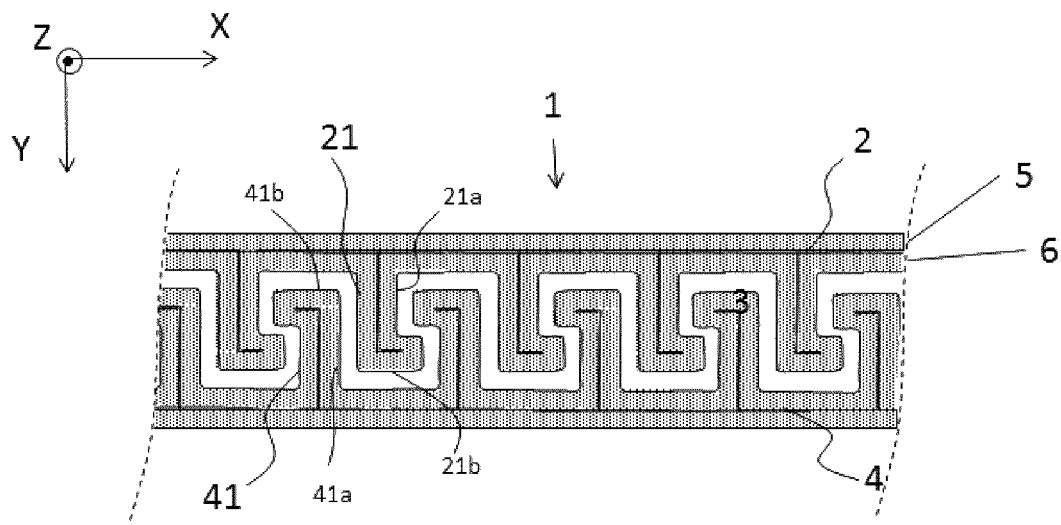
[Fig. 6]
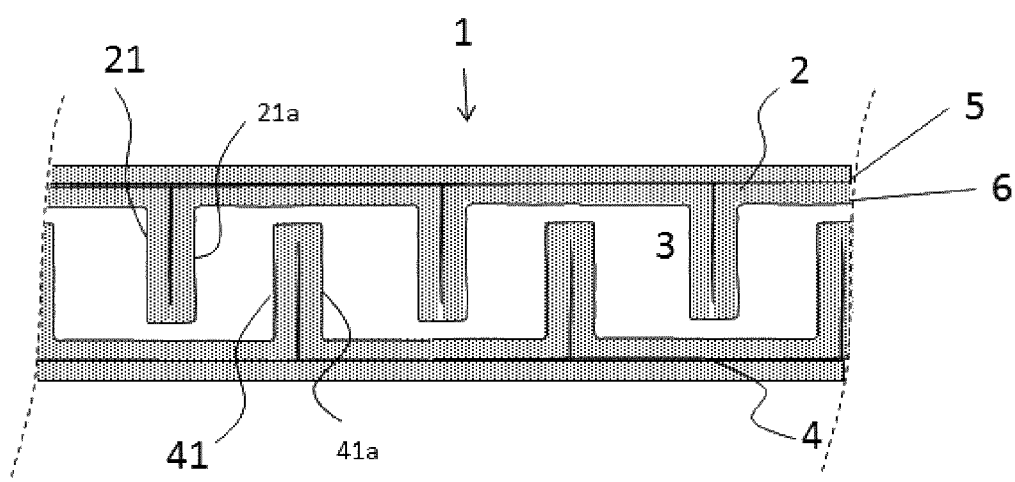

[Fig. 7]
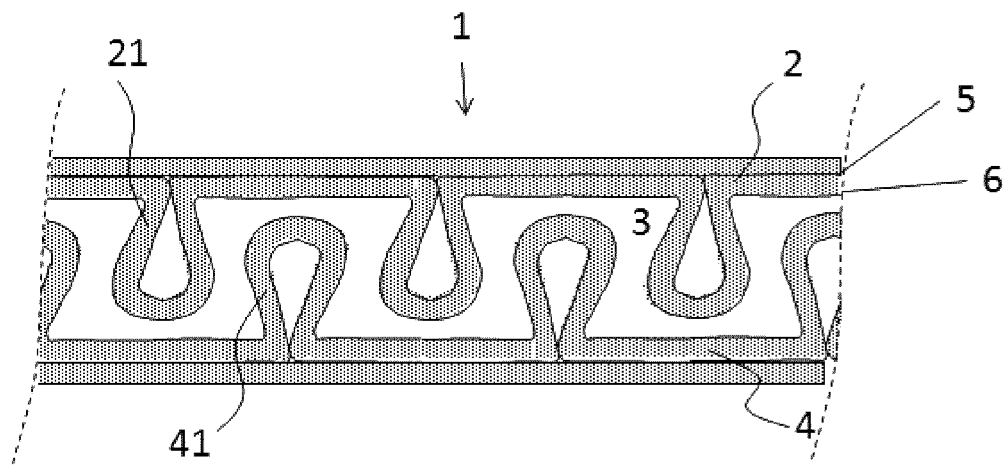
[Fig. 8]
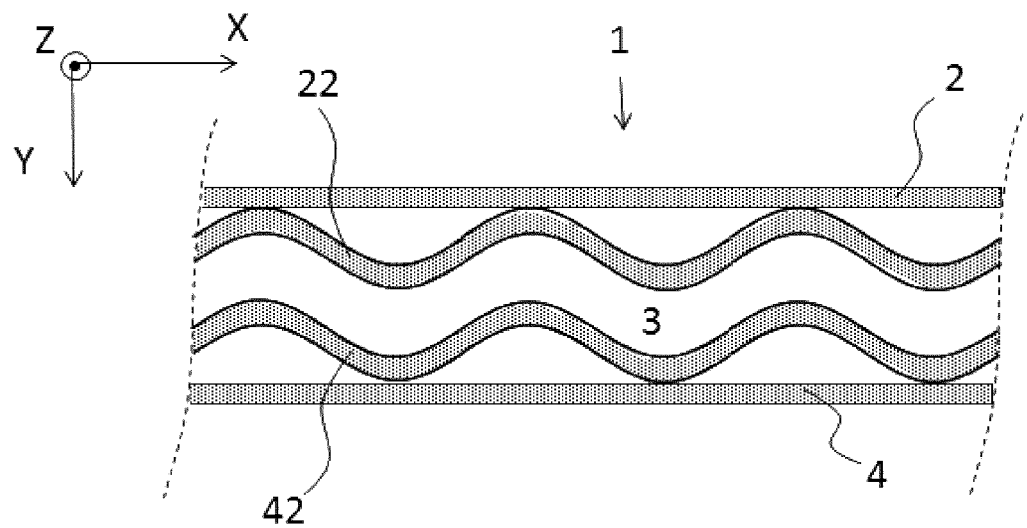

[Fig. 9]
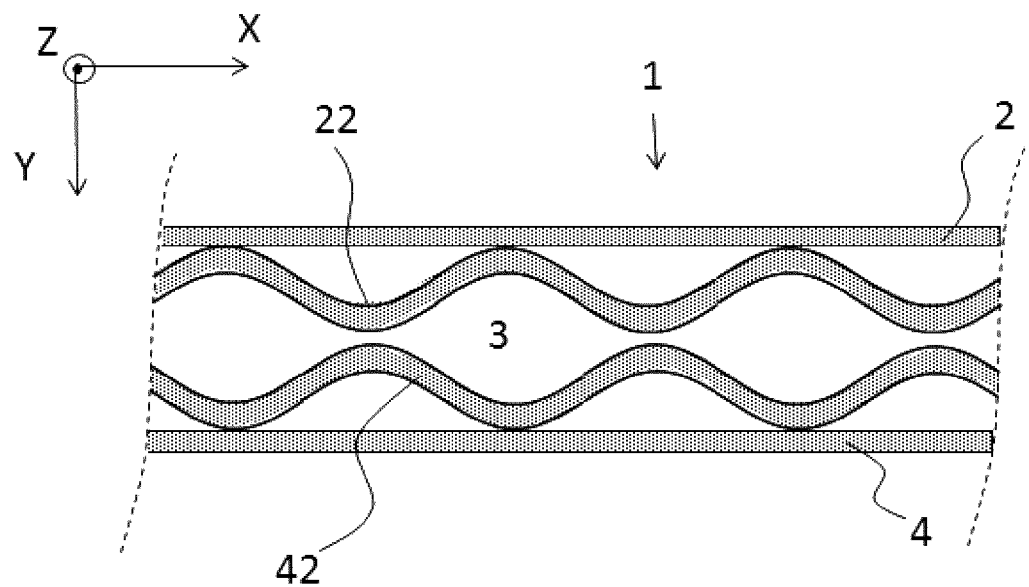
[Fig. 10]
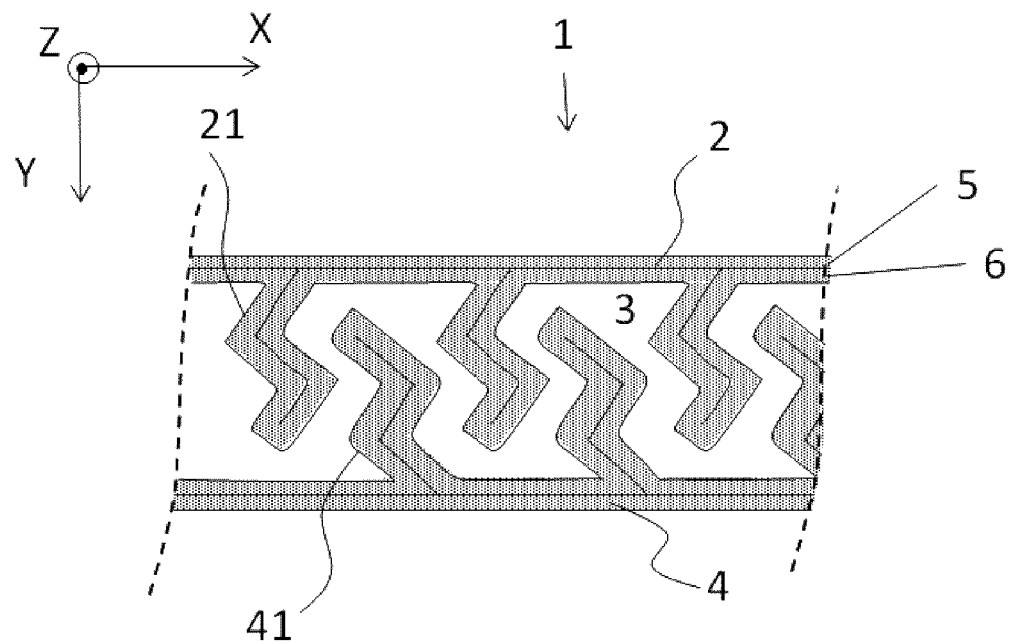

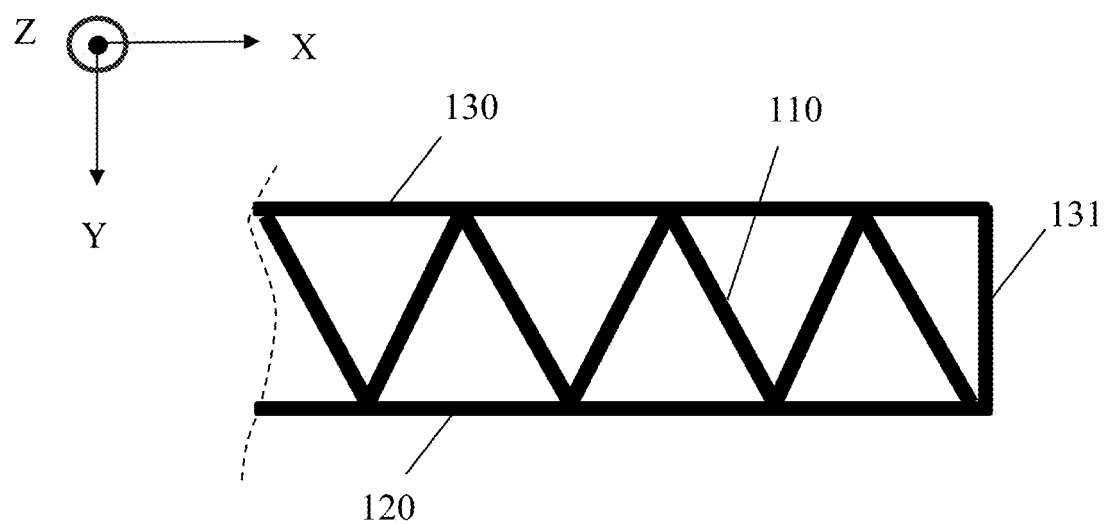
[FIG. 11]

ADDITIVE MANUFACTURING OF CONCRETE CONSTRUCTION ELEMENTS

CROSS-REFERENCE TO RELATED APPLICATIONS

This application is the U.S. National Stage of PCT/EP2020/078294, filed Oct. 8, 2020, which in turn claims priority to French patent application number 1911181 filed Oct. 9, 2019. The content of these applications are incorporated herein by reference in their entireties.

The invention relates to the field of construction. It relates more particularly to the manufacture of concrete construction elements using an additive manufacturing technique.

Also known as "3D printing", additive manufacturing is a method in which a computer-controlled robot manufactures three-dimensional objects by continuously depositing a material, layer by layer. These techniques make it possible in particular to manufacture objects having complex shapes.

The additive manufacturing of concrete or mortar makes it possible to integrate the processes of designing, planning and construction and to automate and to streamline same. Other advantages of this technology are, in particular, reducing labor costs, reducing losses and material consumption, doing away with form works, and reducing the duration of projects and investments.

In this text, both concrete and mortar are intended to mean a material comprising a hydraulic binder and aggregates. In the known technologies, a wet mortar, obtained by mixing a dry mortar and mixing water, is pumped and conveyed to a printhead secured to a robot or a gantry, the movement of which is computer-controlled. A layer of wet mortar is deposited on a layer of previously-deposited mortar, generally while being extruded through a nozzle. The printhead is continually moved according to a predetermined plan, in order to manufacture the finished object.

For example, additive manufacturing has been employed to manufacture concrete walls by printing planar wall surfaces which are opposite and parallel to one another and, inside the cavity formed by these wall surfaces, a "zigzag" structure, i.e. a structure following a broken line which forms alternately protruding and recessed angles, connecting these two wall surfaces. The structure thus delimits a plurality of cavities which are separated from one another by a concrete thickness. Patent KR 10-1911404 describes, for example, such walls comprising three wall surfaces each connected to the opposite wall surface by a zigzag structure.

The invention aims to manufacture construction elements, especially wall elements, having both good mechanical strength, especially in terms of compression, bending and shearing, and good performance in terms of thermal insulation.

To this end, the subject matter of the invention is a method for obtaining a concrete construction element by additive manufacturing, wherein superposed mortar layers are successively deposited so as to form two wall surfaces, opposite one another, so as to form a cavity, as well as a plurality of reinforcement elements each extending from one of the wall surfaces toward the cavity, each reinforcement element being in contact with neither the wall surface opposite to that from which it extends, nor with a reinforcement element extending from the opposite wall surface to that from which it extends.

Another subject matter of the invention is a concrete construction element capable of being obtained according to the method of the invention, comprising two wall surfaces, opposite one another, so as to form a cavity, as well as a plurality of reinforcement elements produced integrally with said wall surfaces and each extending from one of the wall surfaces toward the cavity, each reinforcement element being in contact with neither the wall surface opposite to that from which it extends, nor with a reinforcement element extending from the opposite wall surface to that from which it extends.

The construction element will most commonly be a wall or a wall element, in particular for an external wall or an interior load-bearing wall. It may also be a floor element. The element will be generally intended to be integrated in the structure of a building.

The successive deposition of superposed mortar layers is carried out so as to form two wall surfaces and a plurality of reinforcement elements. The reinforcement elements, printed with the wall surfaces and therefore integral therewith, make it possible to give the construction element manufactured in this way good mechanical strength. The construction element preferably consists of two opposite wall surfaces and reinforcement elements, and optionally an insulating material filling the cavity.

In known walls, the zigzag structure also makes it possible to reinforce the wall, but it appears that this structure creates disadvantageous thermal bridges between the opposite wall surfaces which it connects. In patent KR 10-1911404, for example, each zigzag reinforcement element is in contact with wall surfaces opposite one another in pairs. Surprisingly, it has proved possible to considerably reduce these thermal bridges while retaining an acceptable mechanical strength of the wall. Since they are not in contact either with the wall surface opposite that from which they extend, or with a reinforcement element extending from said opposite wall surface, the reinforcement elements do not form a thermal bridge. "Opposite wall surface" is intended to mean the wall surface immediately opposite, that is to say the wall surface directly facing that from which the reinforcement element extends. In other words, the reinforcement elements are not in contact with the opposite wall surface and with the reinforcement elements extending from the opposite wall surface, either directly or via an additional or intermediate wall surface, since such a wall surface would form a thermal bridge. Generally speaking, it should not be possible to pass through the thickness of the construction element by only passing through mortar, optionally apart from at the lateral ends of the element.

Each reinforcement element is preferably only in contact with the wall surface from which it extends. Nevertheless, as explained in the remainder of the text, it is not excluded that the reinforcement elements be in contact with an optional insulating material filling the cavity. A reinforcement element may also be in contact with another reinforcement element which would extend from the same wall surface as it. In this text, contact is intended to mean direct contact.

Unlike known walls, in which the zigzag structure delimits a plurality of separate cavities, the reinforcement elements of the construction element according to the invention are generally such that the construction element comprises just a single cavity. As shown in the remainder of the text, this cavity can be filled with an insulating material. The presence of a single cavity, aside from the advantage it affords in terms of thermal insulation, makes it possible to facilitate the filling process.

The cavity should be such that it is possible to plot a line therein, passing through the whole construction element in a horizontal plane (with the element being positioned as it was printed) and in the general direction of the wall surfaces, without passing through a mortar layer.

The wall surfaces are preferably planar and parallel to one another. Alternatively, the wall surfaces may have other shapes, such as curved shapes or else broken lines.

The wall surfaces preferably have a rectangular shape; as a result, they have a width and a length. Nevertheless, other shapes are possible.

Generally, due to the use of the additive manufacturing technique which requires the deposition of superposed layers, at least one, especially each, reinforcement element extends linearly in the plane of the wall surface and along one dimension of the wall surface. Commonly, each reinforcement element has a profile extending substantially along the axis normal to the plane of the mortar layers. In the case of rectangular wall surfaces, at least one, especially each, reinforcement element may extend in the plane of the wall surface along the width or along the length of the wall surfaces. In the ultimate use thereof, the wall element may be placed such that the width thereof or the length thereof is arranged vertically, such that the reinforcement elements are able to extend vertically or horizontally.

The shape and distribution of the reinforcement elements influences the mechanical strength and the thermal insulation properties of the construction element obtained.

Preferably, each reinforcement element has an identical shape. Alternatively, the construction element may comprise reinforcement elements having different shapes.

The reinforcement elements may or may not be arranged periodically.

According to an advantageous embodiment, at least one, especially each, reinforcement element comprises a first part extending linearly from one of the wall surfaces and transversely to said wall surfaces. The angle $\alpha$ formed by this first part and by the wall surface is preferably between 75 and 105°, especially between 80 and 100°, or even between 85 and 95°. This angle is advantageously a right angle. When the wall surface is not planar, the angle can be measured by taking into account the plane tangent to the wall surface in the area from which the element extends.

In the direction of extension of the first part (transversely to the wall surfaces), the ratio of the length of this first part to the distance between the wall surfaces is preferably between 0.2 and 0.8, especially between 0.3 and 0.7.

According to this embodiment, at least one, especially each, reinforcement element may form a fin which protrudes with respect to the wall surface from which it extends. The fin may especially have a rectangular profile.

At least one, especially each, reinforcement element may further comprise a second linear part extending from the first part and transversely thereto. The reinforcement element may for example have a T-shaped or L-shaped profile. The ratio of the length of this second part to the distance between the wall surfaces is preferably between 0.1 and 0.7, especially between 0.2 and 0.6. "Transversely" does not necessarily mean that the angle between the first and the second part is a right angle. The angle $\beta$ between the first part and the second part is preferably between 70 and 110°, especially between 80 and 100°. It may be a right angle, as in the case of elements having an L-shaped or T-shaped profile.

According to another embodiment, at least one, especially each, reinforcement element forms a closed curve, especially closed on itself, at one of the wall surfaces, delimiting at least one cell. In this case, the wall element comprises several cavities: the single cavity delimited by the wall surfaces and the cells located inside the reinforcement elements.

Preferably, in order to optimize the mechanical strength of the construction element, and regardless of the shape of the reinforcement elements, two consecutive reinforcement elements extend from two different wall surfaces. The construction element then comprises a plurality of reinforcement elements extending alternately from each of the wall surfaces.

In the plane of one of the wall surfaces, the ratio of the distance between two consecutive reinforcement elements extending from the wall surface in question to the distance between the wall surfaces is preferably between 0.5 and 10, especially between 2 and 8.

In order to ensure a good compromise between thermal and mechanical, the number of reinforcement elements per linear meter of construction element is preferably between 1 and 5, especially between 1 and 4, or even between 2 and 3 (limit values included).

According to another embodiment, the construction element comprises two reinforcement elements each arranged along one of the wall surfaces, and preferably over the whole length of said wall surfaces, and forming a regular pattern, for example sinusoidal or broken lines, thereby delimiting a plurality of cells.

In section in a plane transverse to the wall surfaces, in other words in the plane of the mortar layers, the thickness of the wall surfaces is preferably between 10 and 200 mm, especially between 40 and 120 mm. The thickness of the structural elements is preferably between 20 and 100 cm, especially between 30 and 80 cm.

The lateral dimensions of the construction element are preferably between 1 and 4 m, especially between 1 and 3 m.

The mortar preferably comprises a hydraulic binder and aggregates.

Wet mortar, of pasty consistency, is formed by mixing a dry mortar with water. Dry mortar is intended to mean a pulverulent mixture. After setting and hardening, the final mortar is referred to as hardened mortar, or "concrete".

The hydraulic binder is preferably selected from Portland cements, aluminous cements, sulfoaluminate cements, hydrated lime, ground granulated blast furnace slag, fly ash and mixtures thereof. The hydraulic binder preferably comprises a Portland cement. It advantageously consists of Portland cement.

The aggregates are preferably selected from siliceous, limestone, dolomite aggregates and mixtures thereof. The maximum size of the aggregates is preferably at most 3 mm, especially at most 2 mm and even at most 1 mm, given the reduced section of the pumping device and of the nozzle of the printhead.

The dry mortar preferably comprises at least one additive, especially selected from superplasticizers, thickeners, accelerators and retarders. The dry mortar advantageously comprises inorganic thickeners, for example bloating clays, capable of increasing the yield strength at rest of the wet mortar. The accelerators and retarders make it possible to adjust the time required for setting and hardening of the hydraulic binder.

The composition of the dry mortar is preferably adjusted such that the wet mortar exhibits thixotropic behavior. Preferably, the viscosity of the wet mortar increases by a factor of at least 50 only one second after the wet mortar has left the printing nozzle. The wet mortar then has a low viscosity for high shear rates, such that it can be readily pumped and conveyed, but exhibits an immediate increase in its structural stability as soon as it leaves the nozzle of the printhead, thereby making it possible to support the overlying layers before setting and hardening. This deposition on a still-wet layer of mortar makes it possible to improve the adhesion between the successive layers, and thus the final mechanical strength of the wall element. By contrast, customary methods use accelerators making it possible to greatly accelerate the setting and hardening of the mortar, so as to deposit on layers of a mortar which has already set or hardened, which makes it possible to ensure dimensional stability during printing, but to the detriment of adhesion between successive layers.

The method comprises the successive deposition of superposed mortar layers. As indicated above, the layers are preferably deposited on an underlying layer which has not yet set or has not yet hardened.

The method preferably comprises a step of mixing a dry mortar composition with water, in order to obtain a wet mortar of pasty consistency. The wet mortar is preferably pumped and conveyed, generally in a pipe, to the printhead of a printer. The printhead especially comprises a nozzle through which the wet mortar is extruded. The printer is for example an industrial robot or a gantry which carries the printhead and the movement of which is controlled by a computer. The computer comprises especially a recording medium on which a data set or 3D model is stored as well as instructions which, when they are executed by the computer, cause the latter to control the movement (trajectory, speed, etc.) of the printhead.

The printing speed is typically from 30 to 1000 mm/s, especially from 50 to 300 mm/s. The thickness (or height, since this is the dimension in the vertical direction) of the wet mortar layers is preferably between 5 and 40 mm, especially between 10 and 20 mm. The width of the mortar layers is preferably between 10 and 100 mm, especially between 20 and 60 mm.

As explained in greater detail in the remainder of the text, for each layer the printer can first deposit a strip of mortar, referred to as outer strip, forming the outer envelope of the wall element, then an inner strip adjacent to the outer strip and in contact therewith, which comprises portions parallel to the outer strip, forming, with said outer strip, the wall surfaces, and portions extending toward the cavity, forming the reinforcement elements.

Preferably, the method further comprises a step of filling the cavity (or at least part of the cavity) with an insulating material. In the case in which the reinforcement elements delimit cells, said cells can also be filled with the insulating material, during the same step or a subsequent step.

The insulating material may for example be mineral or organic.

The insulating material is advantageously selected from mineral foams, organic foams, mineral wools, mortars comprising a mineral binder and lightweight aggregates and insulators based on natural materials, especially based on natural fibers (plant or animal fibers).

The filling method is adapted based on the selected material and may be carried out, depending on the case, by pouring, injecting or else spraying a pasty or granular material, or spraying precursor compounds of the material, which forms in situ inside the cavity. The filling method may be carried out by a robot, where appropriate by the same robot as that which carries out the 3D printing.

The mineral foams are especially silica foams or foams based on hydraulic binder, for example cement, mortar or concrete foams. These may especially be obtained by mixing wet concrete or mortar with an aqueous foam. In such a case, the filling step is preferably carried out by pouring the mineral foam in the pasty state into the cavity. The foam can subsequently harden inside the cavity. The filling step can be carried out before hardening of the wall element, especially simultaneously to the manufacture of the wall element, or after hardening of the wall element. After hardening, the mineral foam preferably has a density of less than 200 kg/m$^3$, especially less than 150 kg/m$^3$, or even less than 100 kg/m$^3$. The concrete foam may especially be the foam sold under the reference Airium by LafargeHolcim.

The organic foams are for example polyurethane or polyisocyanurate foams. Such foams may be formed in situ inside the cavity, with the filling step then being carried out by the simultaneous spraying of an isocyanate composition and an alcohol into the cavity.

The mineral wools are especially glass wools, rock wools or else slag wools. They may especially be blowing wools (or loose wool), i.e. be in the form of flakes. In this case, the filling step is carried out by spraying said flakes into the cavity. The mineral wools may be combined with a hydraulic binder, especially a cementitious binder.

The mortars comprising a mineral binder and lightweight aggregates also make it possible to confer insulating properties. The mineral binder is preferably a hydraulic binder, for example a Portland cement. The lightweight aggregates preferably have a density of at most 200 kg/m$^3$. The lightweight aggregates are preferably selected from expanded polystyrene beads, aerogels, perlite, expanded glass beads, vermiculite, expanded clays, cork and cenospheres.

The insulators based on natural materials are especially based on cellulosic materials (cork, wood fibers, cellulose fibers, etc.) or based on animal wools (sheep's wool, etc.).

Regardless of the method employed, the presence of a single cavity can simplify the filling step, making it possible for example to use a single, optionally stationary, filling nozzle, rather than having to use either one nozzle per cavity or a mobile nozzle which has to be moved in order to successively fill the cavities.

When it adheres to the mortar constituting the wall surfaces and the reinforcement elements, the insulating material may have a structural function and thus improve the mechanical properties of the construction element. This is the case for example when the insulating material comprises a mineral binder, especially a hydraulic mineral binder. The method according to the invention may then comprise a step of cutting off the lateral ends of the element. It is then possible to remove the concrete edges formed during the printing and to improve the thermal performance of the wall element.

The construction element may also comprise reinforcing pieces which are not integral with the wall surfaces and which may extend between these wall surfaces. These pieces may especially be mechanically attached to the wall surfaces after or during the manufacture of the construction element. They will preferably be made of polymeric material in order to limit thermal bridges.

The construction elements may be prefabricated elements, intended to be assembled on the building site, for example by means of a mortar, in order to form the external or internal walls (for example interior load-bearing walls) of a building. The elements may also be manufactured directly on the building site and form the complete wall of the building.

The invention and the advantages thereof will be better understood using the following description, with reference to the appended FIGS. 1 to 10, of nonlimiting examples of construction elements. In the case in point, these are wall elements, but they could be other types of construction elements.

The wall elements exemplified here are rectangular parallelepipedal elements comprising two planar wall surfaces which are parallel with one another and extend along a plane XZ, also referred to as "plane of the wall surfaces". In this text, "plane of the wall surfaces" is defined as any plane parallel to the plane XZ. The Y axis is the axis orthogonal to the plane of the wall surfaces. The Z axis is the axis orthogonal to the plane of the layers (plane XY).

BRIEF DESCRIPTION OF THE DRAWINGS

FIGS. 1 to 11 depict part of these elements in section along the plane XY in order to illustrate different examples of reinforcement elements.

FIGS. 1 to 10 depict part of these elements in section along the plane XY in order to illustrate different examples of reinforcement elements. The ends of the elements are not shown in FIGS. 1 to 10: during printing, the ends form for example a return along the Y axis connecting the two walls. FIG. 11 schematically shows a wall element 100 with an end 131 forming a return that connects the two wall surfaces 130, 120. As indicated above, these ends may in some cases be cut off, and therefore no longer be present in the final wall element.

In all the cases shown, the reinforcement elements extend linearly, in the plane of the wall surfaces, along the Z axis (normal to the plane of the layers). In other words, the reinforcement elements are cylinders with the generatrix Z. The position and the shape of a reinforcement element along the X axis does not depend on the height along the Z axis. Nevertheless, the technique of additive manufacturing allows for slightly different designs: the reinforcement elements may for example only extend over a part of the height of the wall surfaces (along the Z axis) and/or the position of the reinforcement elements along the X axis or the shape of the reinforcement elements may depend on the height along the Z axis.

In all the cases shown, the reinforcement elements are arranged regularly. It is nevertheless possible to proceed differently, since the additive manufacturing method is able to produce highly varied and highly complex geometries.

The width of the complete wall element, along the X axis, is for example between 1 and 3 m. The height of the wall element, along the Z axis, is for example between 1 and 3 m. The thickness of the wall element, along the Y axis, is for example between 20 and 100 cm, especially between 30 and 80 cm.

FIG. 1 illustrates a part of a wall element 100 according to the prior art, which comprises a single reinforcement element 110 along a broken line forming alternately protruding and recessed angles and connecting the two walls 120 and 130. This type of wall element is generally manufactured by printing, for a given layer, first the wall surfaces 120 and 130 (and also the lateral edges, not shown), then the reinforcement element 110, and repeating this step. Patent KR 10-1911404 describes a variant of this type of wall, in which the structure is doubled; the wall then comprising three wall surfaces and two zigzag reinforcement elements each connecting two opposite wall surfaces.

FIG. 2 shows a part of a wall element 1 according to an embodiment of the invention.

This element comprises a first wall surface 2 and a second wall surface 4, housing a cavity 3. In the example shown, the section of each wall surface in a sectional plane XY is formed by two adjacent mortar strips: an outer strip and an inner strip 6. For a given layer (a given level along the Z axis), the printer moves in the plane XY and may for example first print the outer strip 5 (including the ends, not shown), which forms the outer contour of the wall element, then, inside the area defined by the outer strip 5, the inner strip 6. This inner strip 6 comprises parts extending along the X axis, which together form part of the wall surface, and parts which extend from the wall surfaces in the direction Y, in other words the reinforcement elements.

The wall element comprises a plurality of reinforcement elements 21, 41, each having a T-shaped profile and extending from one of the wall surfaces 2, 4, toward the cavity 3. Each reinforcement element comprises a first linear part 21a, 41a extending from a wall surface 2, 4 in the plane YZ (orthogonal to the plane of the wall surfaces) and also a second linear part 21b, 41b extending from the first part 21a, 41a in the plane XZ, thus in a plane parallel to the plane of the wall surfaces.

The plurality of reinforcement elements comprises a first plurality of reinforcement elements 21 extending from the first wall surface 2 and a second plurality of reinforcement elements 41 extending from the second wall 4. The reinforcement elements are arranged alternately, each reinforcement element from one of the first and the second plurality being directly surrounded by two reinforcement elements of the other plurality.

In the example depicted, the transverse arms of the T (second parts 21b and 41b) are all in the same plane, here the mid plane between the two wall surfaces, schematically depicted by a dashed line.

The reinforcement elements are only in contact with the wall surface from which they extend. As shown in the figure, they are not in contact either with the other wall surface or with any other reinforcement element.

FIG. 3 depicts a variant in which the transverse arms of the T are in two different planes, parallel to the planes of the wall surfaces. More specifically, the transverse arms of the reinforcement elements 21b, 41b of the first (21), or second (41), respectively, plurality of reinforcement elements are in a first plane, or a second plane, respectively, parallel to the plane of the wall surfaces.

FIG. 4 depicts yet another variant in which the transverse arms of the T (21b and 41b) are elongated, such that the transverse arms 21b of the first reinforcement element 21 are partially facing the arms 41b of the second, adjacent, reinforcement elements 41.

FIG. 5 depicts another variant, in which the reinforcement elements 21 and 41 have an L-shaped profile. Each reinforcement element thus comprises a first part (21a, 41a) and a second part (21b, 41b), the second part forming a return of the first part.

FIG. 6 depicts a variant in which the reinforcement elements 21 and 41 form linear fins protruding from the wall surfaces. Each reinforcement element comprises here only a first linear part (21a, 41a), in other words has an I-shaped profile.

FIG. 7 depicts a variant in which each reinforcement element 22 and 42 forms a curve which is closed on itself at the wall surface from which it extends, thereby delimiting a cell.

In the various variants presented, the reinforcement elements are arranged alternately, each reinforcement element from one of the first and the second plurality being directly surrounded by two reinforcement elements of the other plurality.

FIG. 8 shows another embodiment in which the wall element only comprises two reinforcement elements, a first reinforcement element 22 arranged along the first wall surface 2, and a second reinforcement element 42 arranged along the second wall 4. The first reinforcement element 22 forms a regular pattern, in this case sinusoidal, facing the second reinforcement element 42.

FIG. 9 shows a variant of the embodiment of FIG. 8, in which the two regular patterns are offset by half a period.

In the embodiment of FIGS. 8 and 9, the printer may, for example, in the plane XY, first print the wall surfaces 2 and 4 which form the outer contour of the wall element, then, inside the area defined by these wall surfaces, the reinforcement elements 22 and 42.

FIG. 10 shows a variant in which the reinforcement elements 21 and 41 consist of a succession of broken lines.

Digital simulations made it possible to compare the equivalent thermal conductivity of wall elements according to the invention (geometry of the type depicted in FIG. 2) with that of a wall element according to the prior art (zigzag geometry of the type depicted in FIG. 1). Depending on the case, the cavities were filled with a polyurethane foam (thermal conductivity of 22 mW·m$^{-1}$·K$^{-1}$) or with glass wool (thermal conductivity of 35 mW·m$^{-1}$·K$^{-1}$). The hardened mortar has a thermal conductivity of 750 mW·m$^{-1}$·K$^{-1}$.

In the case of the wall according to the prior art, the equivalent thermal conductivity was 200 mW·m$^{-1}$·K$^{-1}$ with polyurethane foam filling, and 220 mW·m$^{-1}$·K$^{-1}$ with glass wool filling.

In the case of the wall according to the invention, the equivalent thermal conductivity was 100 mW·m$^{-1}$·K$^{-1}$ and 140 mW·m$^{-1}$·K$^{-1}$, respectively.

The invention claimed is:

1. A method for obtaining a concrete wall of a building by additive manufacturing, the method comprising:
   successively depositing superposed mortar layers so as to form (a) two wall surfaces of said concrete wall of the building, opposite one another, so as to form a cavity, and (b) a plurality of reinforcement elements each extending from one of the two wall surfaces toward the cavity, each reinforcement element being in contact with neither the wall surface opposite to that from which it extends, nor with a reinforcement element extending from the opposite wall surface to that from which it extends, and
   filling the cavity with an insulating material.

2. The method according to claim 1, wherein at least one of the plurality of reinforcement elements comprises a first part extending linearly from one of the wall surfaces and transversely to said wall surfaces.

3. The method according to claim 2, wherein at least one of the plurality of reinforcement elements further comprises a second linear part extending from the first part and transversely thereto.

4. The method according to claim 3, wherein at least one of the plurality of reinforcement elements has a T-shaped or L-shaped profile.

5. The method according to claim 1, wherein two consecutive reinforcement elements extend from two different wall surfaces.

6. The method according to claim 5, wherein, in a plane of a wall surface, a ratio of the distance between two consecutive reinforcement elements extending from said wall surface to a distance between the wall surfaces is between 0.5 and 10.

7. The method according to claim 5, wherein a number of said reinforcement elements per linear meter of said wall is between 1 and 5.

8. The method according to claim 1, wherein the insulating material is selected from mineral foams, organic foams, mineral wools, mortars comprising a mineral binder and lightweight aggregates and insulators including one or more of plant and animal fibers.

9. The method according to claim 1, wherein each reinforcement element is only in contact with the wall surface from which it extends, and with the insulating material which fills the cavity.

10. The method according to claim 1, wherein the wall only comprises a single cavity.

11. The method according to claim 1, wherein the wall comprises two reinforcement elements each arranged along one of the two wall surfaces and forming a regular pattern, thereby delimiting a plurality of cells.

12. The method according to claim 6, wherein the ratio is between 2 and 8.

13. The method according to claim 7, wherein the number of said reinforcement elements per linear meter of said wall is between 1 and 4.

14. The method according to claim 11, wherein the regular pattern is sinusoidal or broken lines.

15. The method according to claim 1, wherein at least one of the reinforcement elements of one of the two wall surfaces extends from said one of the two wall surfaces so as to be positioned between two adjacent reinforcement elements that extend from the other one of the two wall surfaces that is opposite said one of the two wall surfaces.

16. The method according to claim 1, wherein a thickness of each of the two wall surfaces is between 10 and 200 mm.

17. The method according to claim 1, wherein a thickness of the concrete wall is between 20 and 100 cm.

18. The method according to claim 1, wherein a thickness of the superposed mortar layers is between 5 and 40 mm.

19. The method according to claim 1, wherein at least one of the plurality of reinforcement elements extends from a first wall surface of the two wall surfaces and at least another one of the plurality of reinforcement elements extends from a second wall surface of the two wall surfaces.

20. A concrete wall of a building obtained by additive manufacturing with a method comprising successively depositing superposed mortar layers so as to form (a) two wall surfaces of said concrete wall of the building, opposite one another, so as to form a cavity, and (b) a plurality of reinforcement elements each extending from one of the two wall surfaces toward the cavity, each reinforcement element being in contact with neither the wall surface opposite to that from which it extends, nor with a reinforcement element extending from the opposite wall surface to that from which it extends, wherein the cavity is filled with an insulating material.

21. The concrete wall according to claim 20, wherein at least one of the plurality of reinforcement elements extends from a first wall surface of the two wall surfaces and at least another one of the plurality of reinforcement elements extends from a second wall surface of the two wall surfaces.

22. A method for obtaining a concrete wall of a building by additive manufacturing, the method comprising successively depositing superposed mortar layers so as to form (a) two wall surfaces of said concrete wall of the building, opposite one another, so as to form a cavity, and (b) a plurality of reinforcement elements each extending from one of the two wall surfaces toward the cavity, each reinforcement element being in contact with neither the wall surface opposite to that from which it extends, nor with a reinforcement element extending from the opposite wall surface to that from which it extends, wherein each reinforcement element forms a closed curve, delimiting at least one cell.

23. The method according to claim 22, wherein the curve is closed on itself at one of the two wall surfaces.

24. A method for obtaining a concrete construction element of a building by additive manufacturing, the method comprising:

successively depositing superposed mortar layers so as to form (a) two wall surfaces of said concrete construction element of the building, opposite one another, so as to form a cavity, said two wall surfaces being connected to each other by mortar at an end of the concrete construction element during said depositing, and (b) a plurality of reinforcement elements each extending from one of the two wall surfaces toward the cavity, each reinforcement element being in contact with neither the wall surface opposite to that from which it extends, nor with a reinforcement element extending from the opposite wall surface to that from which it extends, and filling the cavity with an insulating material.

\* \* \* \* \*